United States Patent [19]
Kilian

[11] 3,738,090
[45] June 12, 1973

[54] PARTICLE SEPARATION SYSTEM
[76] Inventor: Rodolfo G. Kilian, Rio Panuco 82, Mexico City, Mexico
[22] Filed: Sept. 29, 1970
[21] Appl. No.: 76,487

[52] U.S. Cl. ..................... 55/349, 34/10, 34/57 A, 55/459, 55/473, 302/59, 415/219 B
[51] Int. Cl. ............................................. B01d 45/12
[58] Field of Search ........................... 55/345–348, 349, 459, 460, 473; 209/144; 415/219 B; 34/10, 57 A; 159/4 E; 302/28, 59

[56] References Cited
UNITED STATES PATENTS

| | | | |
|---|---|---|---|
| 877,191 | 1/1908 | Hanson | 415/219 B |
| 3,056,212 | 10/1962 | Jamison | 34/10 |
| 652,045 | 6/1900 | Ruetschi | 55/346 |
| 821,819 | 5/1906 | Neumann | 209/144 |
| 837,705 | 12/1906 | Morse | 55/459 |
| 1,344,146 | 6/1920 | Peck | 55/459 |
| 2,259,919 | 10/1941 | Bacon et al. | 55/459 |
| 3,188,680 | 6/1965 | Black, Jr. | 55/459 |

FOREIGN PATENTS OR APPLICATIONS

| | | | |
|---|---|---|---|
| 629,791 | 5/1936 | Germany | 55/349 |

OTHER PUBLICATIONS
Industrial Canada — Plant Engineering pages 15–20 dated February 1970.
Plant Administration Engineering — National Starch plant pages 54, 55 dated October 1969.

*Primary Examiner*—Bernard Nozick
*Attorney*—Wolfe, Hubbard, Leydig, Voit & Osann

[57] ABSTRACT

Apparatus is illustrated for separating particles from a carrier gas comprising, in combination, a centrifugal fan having impeller blades and a fan casing with the casing being radially separated from the ends of the blades and a plurality of cyclone collectors radially arranged in close proximity with respect to the fan. Conduits are positioned between the fan and the collectors with one end of the conduits opening into the fan casing and the other ends thereof opening into individual collectors. The walls of the conduits are arranged such that particles entering the conduits from the fan continue to the collectors substantially along an undisturbed trajectory and the conduits have a substantially continuously increasing cross-sectional area from the fan to the collectors.

5 Claims, 5 Drawing Figures

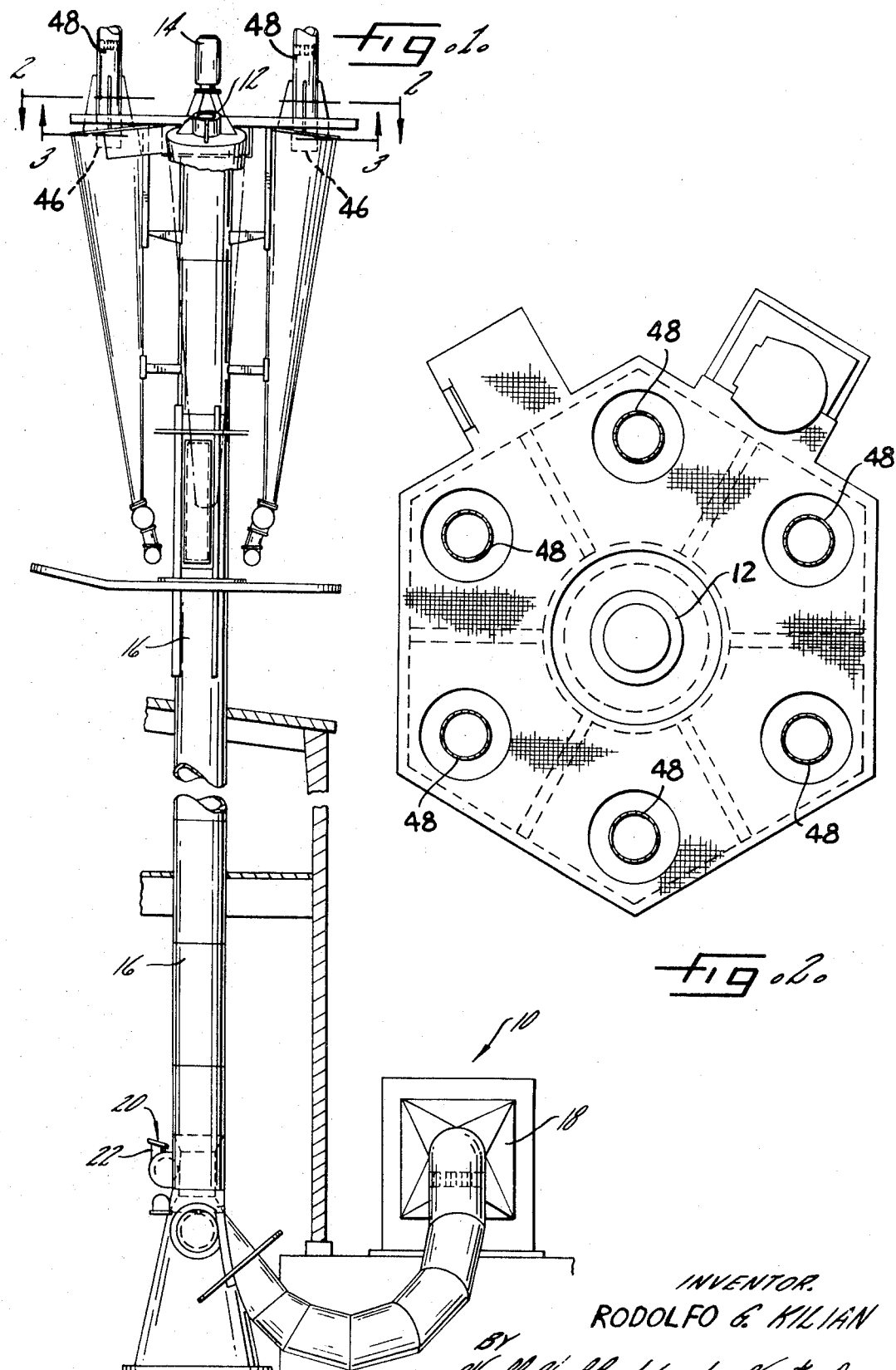

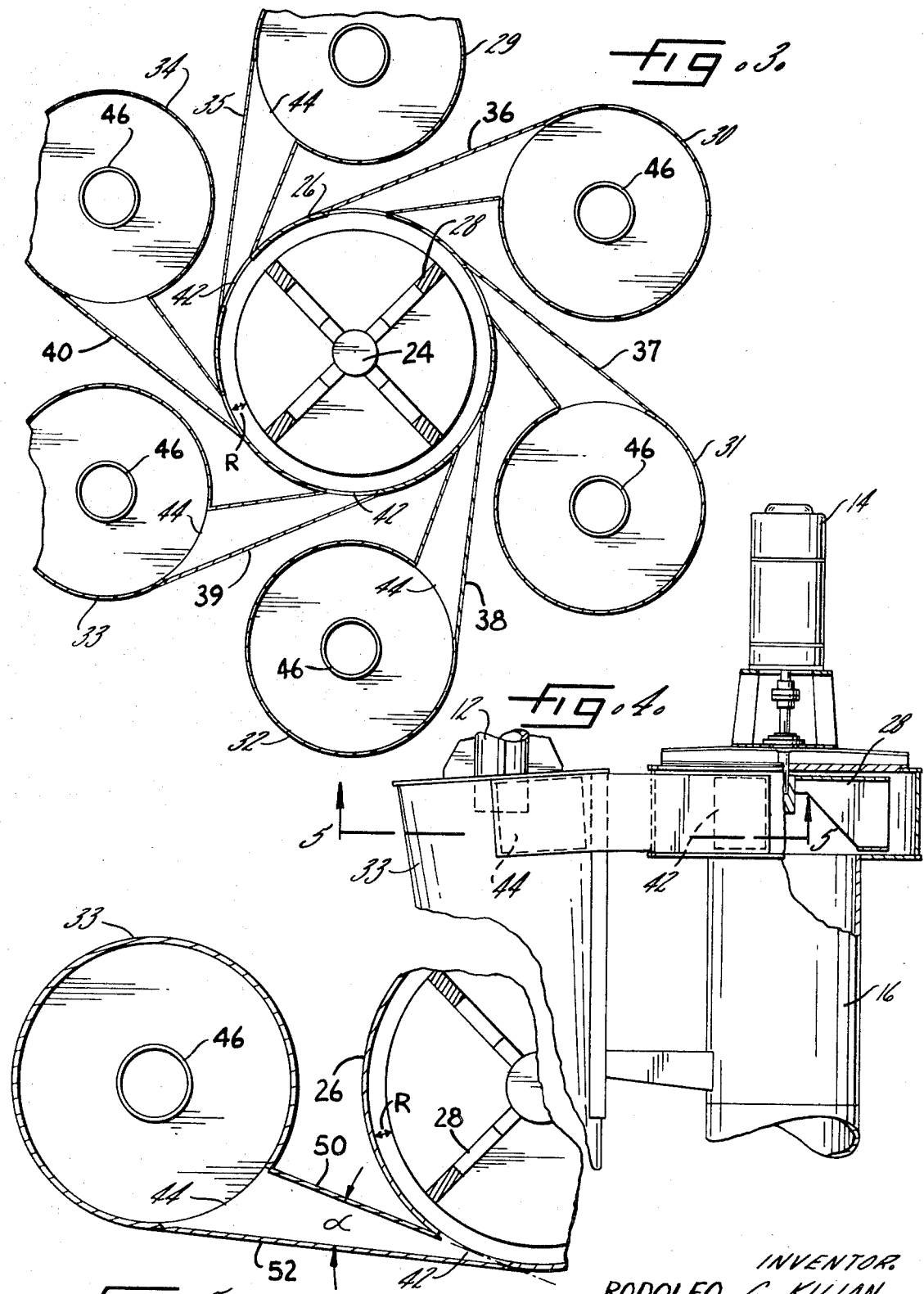

PARTICLE SEPARATION SYSTEM

DESCRIPTION OF THE INVENTION

This invention relates to the removal of solid particles from gas streams in which they are present and, more particularly, to apparatus and means for accomplishing such removal with the use of cyclone collectors.

The use of cyclone collectors for the recovery of solid particles from a gaseous carrier medium is well known. One manner for using such collectors involves radially placing a plurality of cyclone collectors around and in communication with a centrifugal fan and, thereafter, introducing a particle-gas mixture into the eye of the fan. The fan propels the particle-gas mixture into the cyclone collectors which then function to separate the particles from the gas.

The efficiency of particle collection in a system such as above-described can be increased in several ways. One manner is to increase the speed at which the particle-gas system enters the collectors. Another method for increasing the collection efficiency involves decreasing the size of the cyclone collectors.

While the techniques described above can be used to increase collection efficiency, their use is accompanied by certain disadvantages. Thus, increasing particle velocity by increasing gas speed is expensive from a power consumption viewpoint. Since the pressure drop across a cyclone collector is proportional to the square of the velocity of the gas entering the collector and the fan horse power requirement proportional to the cube of such velocity, the power required to increase efficiency by increasing gas speed and thus particle velocity can be prohibitive. Attempting to increase collection efficiency by reducing the size of the collectors is accompanied by the necessity of using an increased number of collectors to handle a given quantity of a solid-gas mixture. This of course increases the capital expenditure required for the collection system.

Accordingly, it is an object of the present invention to provide a cyclone collecting system for separating particles from a carrier gas wherein high collection efficiency can be achieved without the necessity of using a large number of cyclone collectors or a large consumption of power. A related object is to provide such a collection system which occupies only a small quantity of space.

Other objects and advantages of the present invention will become apparent upon reading the following detailed description and upon reference to the drawings wherein:

FIG. 1 is a fragmentary front elevation view of a particle dryer and collection system;

FIG. 2 is an enlarged horizontal sectional view taken along line 2—2 in FIG. 1;

FIG. 3 is an enlarged horizontal sectional view taken along line 3—3 in FIG. 1 showing an arrangement of cyclone collectors around a centrifugal fan and conduits connecting the fan and the collectors;

FIG. 4 is an enlarged vertical sectional view illustrating the conduit between the fan and a single collector of FIG. 1; and FIG. 5 is an enlarged horizontal sectional view taken along line 5—5 of FIG. 4.

While the invention is susceptible of various modifications and alternative constructions, there is shown in the drawings and will herein be described in detail the preferred embodiments. It is to be understood, however, that it is not intended to limit the invention to the specific forms disclosed. On the contrary, it is intended to cover all modifications and alternative constructions falling within the spirit and scope of the invention as expressed in the appended claims. For example, the invention will be hereinafter discussed with reference to FIG. 1 which illustrates a dryer and separation system useful for processing starch. However, it should be readily apparent that those aspects of the illustrated system which relate to particle separation are widely applicable to any system wherein particles are to be separated from a gaseous medium by means of cyclone separators. Thus, the present invention is readily applicable to removing solid pollutants, e.g., dust, from the air as well as recovering other solid materials which have been dried in air such as corn fibers, gluten, etc.

Briefly stated, the particle separation apparatus illustrated and discussed herein includes a centrifugal fan and a plurality of radially arranged cyclone collectors located in close proximity to the fan casing and connected thereto by means of short conduits. The walls of the conduits are arranged such that particles entering the conduits continue to the collectors substantially along an undisturbed trajectory whereby wall collisions are avoided. The fan casing is separated from the ends of the fan impeller blades in order to permit gas expansion prior to the conduit entrances and, preferably, the conduits have a substantially continuously increasing cross-sectional area to provide for further gas expansion and to minimize energy loses due to turbulence. In operation, gas leaving the impeller blades expands in the fan and also preferably in the conduits with a consequent reduction in gas velocity and a resultant decreased pressure drop over the collectors. However, due to the close proximity of the collectors to the fan, i.e., the short conduits, and the fact particle trajectory is substantially undisturbed, the particles substantially maintain their initial high velocity thus resulting in good collection efficiency.

Turning now to the drawings, FIG. 1 illustrates a flash starch dryer in which the particle separation system of the present invention can be employed. As shown, air 10 is drawn by the centrifugal fan 12 driven by the motor 14 into the vertical chamber 16. Prior to entering the chamber 16, the air is heated by means of the heater 18. Wet starch 20 is introduced into the chamber at the port 22 by known means and the interaction of the heated air and wet starch as the mixture is drawn up the chamber 16 serves to dry the starch. As more particularly shown in FIG. 3, as the starch-air mixture reaches the top of the column 16 it enters the eye 24 of the fan 12 and the mixture is propelled outwardly toward the fan casing 26 by means of the fan impeller blades 28.

Referring still to the drawings, the manner in which the starch particles are separated from the heated air in which they have been conveyed is effected by means of the six cyclone collectors 29–34 radially arranged around the fan 12 and in close proximity therewith. The particle-gas mixture is conveyed from the fan casing to the cyclone collectors by means of the short conduits 35–40 with one end of the conduits opening into the fan casing at the conduit entrances 42 and the other end of the conduits opening into the collectors at the collector entrances 44. In the collectors, particle separation occurs with the particles being recovered in the bottom of the collectors and the carrier exhaust air exiting through the vortex finders 46 and cyclone exhaust pipes 48.

Referring specifically to FIGS. 3–5, it is an important aspect of the present invention that the fan casing be separated a radial distance, R, from the ends of the fan impeller blades 28. Such separation permits air expansion in the fan housing and a consequent reduction in air velocity prior to the conduit entrances. By achieving a velocity reduction in the fan housing, shorter conduits can be employed to obtain a desired reduced air velocity at a collector entrance. Short conduits are desirable since particle slow down due to air drag is minimized and less overall space is required fro the system.

In selecting an appropriate separation distance, R, between the impeller blades and the fan casing, several factors should be considered. While a large distance is desirable for achieving a large air velocity reduction, the distance should not be so large as to result in an adverse reduction in particle velocity due to air drag. Similarly, as the distance R is increased, the cost of the fan increases and it becomes more difficult to obtain an integrally supported dryer-separation system. In this latter respect, it should be noted that the cyclone collectors illustrated in FIG. 1 are supported by the vertical drying chamber 16 with no independent support means. However, as the diameter of the fan casing increases, such integral support becomes more difficult to achieve since the collectors are separated a greater distance from the chamber which serves to support them. As a practical matter, a ratio of casing diameter to impeller blade diameter of between about 1.1 and 2 is useful while a ratio between about 1.3 and 1.6 is preferred.

Referring again to the drawings, the conduits 35–40 are shown to be symmetrically arranged around the fan casing 26 and, as particularly shown in FIG. 5, have one side wall 52 which forms a substantially tangential extension of the fan casing. Such a side wall configuration is instrumental in assuring that particles which enter the conduits will continue to the collectors substantially along an undisturbed trajectory and thus at a velocity which is not diminished by wall collisions and the like. In a preferred aspect of the present invention, the other side wall of the conduits 50 is not positioned parallel to the tangentially extending side wall, but rather diverges therefrom in a manner such that the conduit cross-sectional area continuously expands from the fan casing to the collector. By providing conduits with such expanding cross-sectional area, a further expansion of the air can be achieved with a resultant reduction in air velocity. Thus, when such conduits are used, a smaller casing separation distance, R, can be employed in order to achieve a given reduced air velocity at the cyclone collector inlets. This, of course, has the advantages indicated above with respect to overall compactness of the dryer-separation system. Moreover, the fact that the conduit area increases substantially continuously as illustrated in the drawings is desirable since such results in a smooth, non-turbulent expansion of the air which is helpful in maintaining maximum particle velocity.

Referring again specifically to FIG. 5, the side walls 50 and 52 of a typical conduit illustrated in FIG. 3 are arranged such that they diverge from the fan casing 26 at an angle, $\alpha$. In order to optimize the advantages of the present invention, the diverging angle, $\alpha$, should be between about 10° and 30°. With smaller diverging angles, longer conduit lengths are necessary to achieve a desired reduction in air velocity at the collector entrance. Such longer conduit lengths adversely effect particle velocity since the effects of air drag become more pronounced the longer the particles are in the conduits in contact with the slower moving air. On the other hand, air turbulence becomes an increasing problem as diverging angles in excess of about 30° are employed.

While for purposes of illustration, the expanding cross-sectional area of the conduits shown in drawings and discussed herein is achieved by the use of a diverging side 50, it should be apparent that the advantageous increase in conduit area can be obtained by having any of the conduit walls, e.g., the top and bottom walls, in a non-parallel relationship. Thus, it is the continuously expanding cross-sectional area which constitutes an important feature of conduit design. In operation, as the particle-air mixture flows through the conduit, the air continuously expands to fill the progressively increasing area. However, so long as the conduits are short (e.g., the diverging conduit side wall 50 has a length such that the ratio of its length to the diameter of the fan casing is between about 0.05 and 1.50) and the conduits do not contain abrupt changes in cross-section, the particles maintain substantially their undisturbed trajectory and speed. As a result, there is a substantial velocity differential between the particles and the air at the entrance to the collectors. This difference in particle and air velocity contributes directly to the advantages realized by the present invention, and for optimum collection efficiency the velocity difference should be such that the particle velocity is at least about two times and, preferably, at least about ten times the velocity of the air as the particle-air mixture enters the collectors.

For purposes of further illustration, the following represents an embodiment of a separation system in accordance with the present invention. The separation system comprises a standard material handling centrifugal fan with four radial blades capable of 900–1200 rpm and delivering 30,000 cfm against a total head of about 12 inches of water. An 80.5 inch diameter casing surrounds the blades which themselves have a diameter of 57 inches. Six high efficiency, conical cyclone collectors each capable of handling 5,000 cfm of air with a ratio of 20 lbs. of air/lb. solid are symmetrically placed around the fan casing and connected thereto by means of conduits such as illustrated in FIG. 5. Conduit length (as determined by the length of the conduit side wall 50) is 34.0 inches, conduit height (as determined by the distance between the conduit top and bottom wall) is inches, and the diverging angle, $\alpha$, is 22°. In operation, the approximate air and particle velocity in the separation system at various points is as follows:

| Location | Velocity (fpm) | |
|---|---|---|
| | Air | Particle |
| At End of Fan Blades | 12,500 | 12,500 |
| At Conduit Entrance | 8,800 | 7,000 |
| At Collector Entrance | 2,000 | 6,500 |

The separation system illustrated above is particularly useful in combination with a starch flash dryer such as illustrated in FIG. 1. Using such, 15,000 lbs./hour of wet starch can be dried with a collection efficiency of 99.99 percent.

I claim as my invention:

1. An apparatus for separating particles from a carrier gas comprising, in combination,
   a. a centrifugal fan having radially extending impeller blades,
   b. means for rotating said impeller blades about a generally vertical axis,
   c. means defining a substantially cylindrical casing enclosing located fan and having a centrally locate opening in the bottom thereof for introducing particle containing gas into said fan, said casing having vertical side walls of about the same height as said impeller blades and being radially separated from the end of said impeller blades to permit expansion of said carrier gas in the space between the end of the impeller blades and said side walls,
   d. a plurality of generally vertically oriented cyclone collectors arranged radially about said casing, and
   e. a plurality of conduits each having a generally rectangular cross-section interconnecting said casing and respective ones of said collectors and providing gas communication therebetween, said conduits each having generally straight walls such that particles entering said conduits from said fan pass into said collectors with substantially undisturbed trajectory and said conduits each having a continuously increasing cross-sectional area from said fan casing to said collectors and a short length such that particle velocity within said conduits diminishes a substantially lesser amount than does the velocity of said carrier gas.

2. The apparatus of claim 1 wherein the ratio of fan casing diameter to fan impeller blade diameter is between about 1.1 and 2.

3. The apparatus of claim 2 wherein the conduits contain a first side wall which forms a substantially tangential extension of the fan casing and a second side wall which diverges from said first side wall, the diverging angle between said side walls being between about 10° and 30°.

4. The apparatus of claim 3 wherein the ratio of the length of the second side wall to the fan casing diameter is between about 0.05 and 1.05.

5. The apparatus of claim 4 wherein the ratio of fan casing diameter to fan impeller blade diameter is between about 1.3 and 1.6.

* * * * *

UNITED STATES PATENT OFFICE
CERTIFICATE OF CORRECTION

Patent No. 3,738,090      Dated June 12, 1973

Inventor(s) Rodolfo G. Kilian

It is certified that error appears in the above-identified patent and that said Letters Patent are hereby corrected as shown below:

Column 1, lines 41 and 46, "system" should be --apparatus--

Column 3, line 14, "fro" should be --for--

Column 5, line 8, (claim 1), after "enclosing" the word "located" should be deleted and the word --said-- substituted therefor Colum 6, line 19, (claim 4) "1.05" should be --1.50--

Signed and sealed this 26th day of March 1974.

(SEAL)
Attest:

EDWARD M. FLETCHER, JR.
Attesting Officer

C. MARSHALL DANN
Commissioner of Patents